(12) United States Patent
Shaffer et al.

(10) Patent No.: US 8,675,849 B2
(45) Date of Patent: Mar. 18, 2014

(54) UBIQUITOUS TRANSFER OF A PHONE NUMBER TO ANOTHER PHONE

(75) Inventors: Shmuel Shaffer, Palo Alto, CA (US); Labhesh Patel, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 2085 days.

(21) Appl. No.: 11/054,792

(22) Filed: Feb. 9, 2005

(65) Prior Publication Data
US 2006/0176874 A1   Aug. 10, 2006

(51) Int. Cl.
H04M 3/42 (2006.01)
H04M 1/64 (2006.01)
H04M 1/00 (2006.01)
H04M 3/00 (2006.01)

(52) U.S. Cl.
USPC ...... 379/201.01; 379/85; 379/372; 455/414.1

(58) Field of Classification Search
USPC .............. 379/93, 88, 85, 88.01, 88.03, 88.19, 379/88.2, 88.21, 93.01, 93.03, 93.18, 379/201.01, 204.14, 207.15, 372; 455/575, 455/414.1, 415
See application file for complete search history.

(56) References Cited

U.S. PATENT DOCUMENTS

| | | | | |
|---|---|---|---|---|
| 5,251,250 A * | 10/1993 | Obata et al. | ................ | 455/412.2 |
| 5,327,492 A * | 7/1994 | Parola | ............................ | 379/361 |
| 5,334,974 A * | 8/1994 | Simms et al. | ................ | 340/990 |
| 5,638,436 A * | 6/1997 | Hamilton et al. | ............ | 379/351 |
| 5,703,935 A * | 12/1997 | Raissyan et al. | .......... | 379/88.18 |
| 5,752,195 A | 5/1998 | Tsuji et al. | ................... | 455/462 |
| 5,781,625 A * | 7/1998 | Sizer, II | ........................ | 379/257 |
| 5,796,806 A * | 8/1998 | Birckbichler | ................ | 379/88.2 |
| 5,913,162 A * | 6/1999 | Gourdin et al. | ............... | 455/424 |
| 5,991,372 A * | 11/1999 | Davenport D'Ingianni et al. | ......................... | 379/91.02 |
| 6,026,149 A | 2/2000 | Fuller et al. | ................ | 379/88.21 |
| 6,298,055 B1 * | 10/2001 | Wildfeuer | ..................... | 370/352 |
| 6,339,643 B1 * | 1/2002 | Mastrocola et al. | ...... | 379/433.06 |
| 6,546,083 B1 * | 4/2003 | Chaves et al. | ............... | 379/88.03 |
| 6,654,619 B1 | 11/2003 | Zicker et al. | .................. | 455/564 |
| 6,668,055 B2 | 12/2003 | Marwell et al. | .......... | 379/265.13 |
| 6,724,863 B1 | 4/2004 | Bedingfield | ............... | 379/88.12 |
| 6,735,286 B1 | 5/2004 | Hansen et al. | ................... | 379/52 |
| 6,735,457 B1 * | 5/2004 | Link et al. | .................. | 455/575.1 |
| 6,944,283 B1 * | 9/2005 | Klein | ........................ | 379/355.04 |
| 2002/0015485 A1 * | 2/2002 | Bhusri | ..................... | 379/220.01 |
| 2002/0072970 A1 * | 6/2002 | Miller et al. | ..................... | 705/14 |
| 2002/0105939 A1 * | 8/2002 | Vassilovski et al. | .......... | 370/349 |
| 2002/0150233 A1 * | 10/2002 | Pietrowicz | ............... | 379/390.01 |
| 2003/0027555 A1 * | 2/2003 | Malackowski et al. | ........ | 455/414 |
| 2003/0163310 A1 * | 8/2003 | Caldwell et al. | .............. | 704/235 |
| 2004/0037219 A1 * | 2/2004 | Shaffer et al. | .................. | 370/217 |
| 2005/0226221 A1 * | 10/2005 | Fotta et al. | ..................... | 370/352 |
| 2006/0023852 A1 * | 2/2006 | Casey | ......................... | 379/93.18 |
| 2007/0141993 A1 * | 6/2007 | Franz et al. | ................... | 455/67.7 |

OTHER PUBLICATIONS

U.S. Appl. No. 10/988,793, entitled "Handoff of Communication Sessions Between Cellular and Desktop Telephones," filed Nov. 15, 2004, 43 pages.

* cited by examiner

Primary Examiner — Khai N Nguyen
(74) Attorney, Agent, or Firm — Baker Botts L.L.P.

(57) ABSTRACT

A method of receiving a phone number is provided, including receiving, at a receiver of a first phone during a first voice communication session between the first phone and a second phone, a phone number transmitted by a user of the second phone after the first voice communication session is established. The phone number is detected with a signal detector coupled for communication with the receiver, and stored in a memory coupled to the signal detector.

21 Claims, 2 Drawing Sheets

UBIQUITOUS TRANSFER OF A PHONE NUMBER TO ANOTHER PHONE

TECHNICAL FIELD OF THE INVENTION

This invention relates in general to telecommunications, and more particularly to ubiquitous transfer by transmitting a phone number to another phone.

BACKGROUND OF THE INVENTION

When an individual needs to be connected to a person that the individual does not know the phone number of, the individual can call an operator or a secretary and ask to be transferred to the person's phone. Similarly the individual can call an automatic attendant and indicate that the individual wants to be transferred to that person. In either case, the system may rely on features enabled by a private branch exchange (PBX) or Central Office (CO) Centrex equipment.

Such equipment is not always available to reach a person, for example, after business hours. Additionally, the individual may be talking on a phone while driving or be otherwise occupied, and a second person my desire to provide the individual with the number of a third person. To register the new number, the individual may attempt to remember the new number, pull out a pen and write it down while continuing the activity, or stop the activity and write down the number. Any of these methods may compromise the individual's safety when involved in a hazardous activity, such as driving, or may get in the way of other activities.

SUMMARY OF THE INVENTION

In accordance with the present invention, the disadvantages and problems associated with communicating phone numbers between two people communicating over telecommunications equipment have been substantially reduced or eliminated. In particular, a system and method are provided that enable transferring a phone number from a first phone to a second phone by transmitting DTMF or voice signals from the first phone to the second phone.

In accordance with one embodiment of the present invention, a method of receiving a phone number includes receiving, at a receiver of a first phone during a first voice communication session between the first phone and a second phone, a phone number transmitted by a user of the second phone after the first voice communication session is established. The phone number is detected with a signal detector coupled for communication with the receiver, and stored in a memory coupled to the signal detector.

Particular embodiments may also include receiving DTMF signals corresponding to the phone number, and the signal detector including DTMF signal recognition capability. Voice signals spoken by the user of the second phone corresponding to the phone number may also be received, and the signal detector may include voice recognition capability.

In accordance with another embodiment of the present invention, a system for receiving a phone number may include a receiver of a first phone being operable to receive a phone number during a first voice communication session between the first phone and a second phone. The phone number transmitted by a user of the second phone after the first voice communication session is established. The system also includes a signal detector coupled for communication with the receiver to detect the phone number. Memory may be coupled to the signal detector to store the phone number.

Technical advantages of certain embodiments of the present invention include a way of capturing a phone number of a third phone using a first phone. The phone number may be keyed in by a second person on a second phone during an active voice communication session between the first and second phones. The captured number can be used by the first phone at some time in the future to place a call to the third phone with a single command.

Other technical advantages of certain embodiments of the present invention include reduced risk associated with obtaining a phone number (or any other digital information) when a caller is using a cell phone while driving and/or is engaged in other activities. The phone number may be entered by a remote user and automatically saved by the caller's phone. This removes the need for the caller to attempt to drive and/or continue the other activity while writing down the phone number or concentrating on remembering the phone number.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
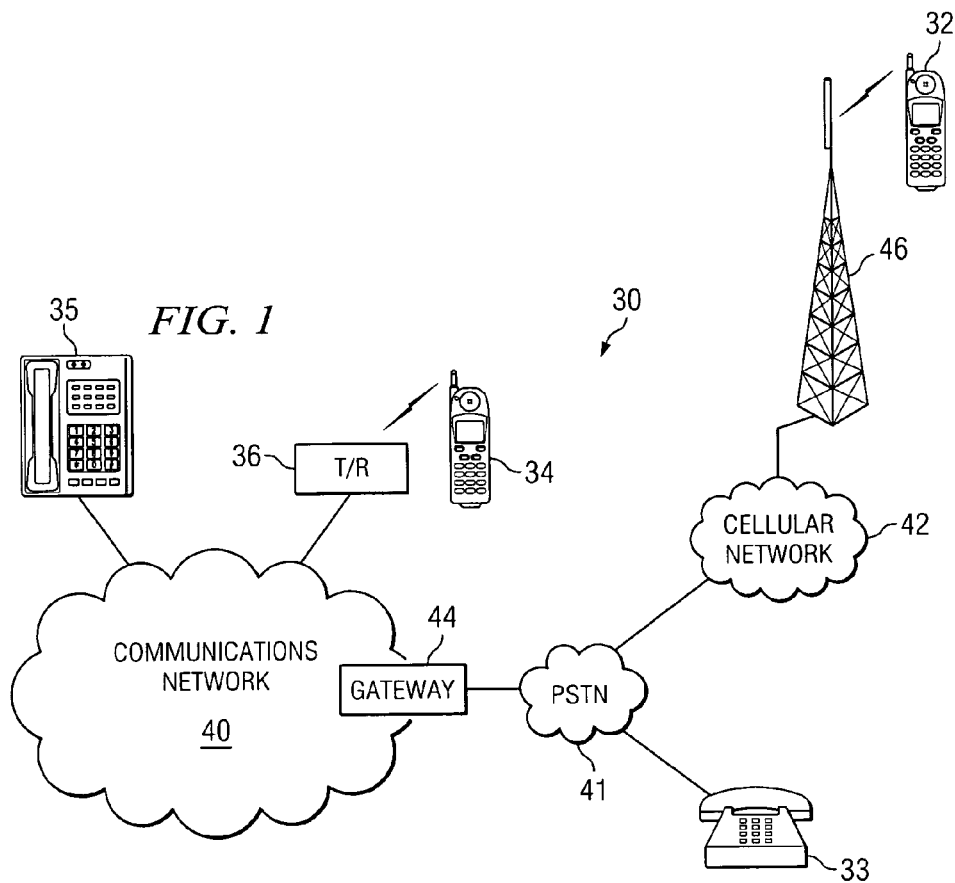
FIG. 1 illustrates a communication system for connecting remote endpoints.

FIG. 1 illustrates a communication system 30 including a plurality of endpoints 32-35 having the ability to establish voice communication sessions with each other. Such communication sessions may be established using communication networks 40, 41, 42 and/or additional endpoints, components, resources, or networks coupled with communication networks 40, 41, or 42.

In accordance with particular embodiments of the present invention, systems and methods are provided that allow a first endpoint to capture and store a phone number transmitted from a second endpoint, while the first and second endpoints are participating in a voice communication session with each other. A voice communication session, for the purposes of this specification, is established between first and second phones when users of the first and second phones are able to speak to one another using the first and second phones. The phone number may be transmitted from the second endpoint to the first endpoint during the voice communication session by pressing buttons on a keypad of the second endpoint, thereby creating dual tone multiple frequency (DTMF) signals that are captured, recorded, and/or stored by the first endpoint. Alternatively, the phone number may be transmitted from the second endpoint to the first endpoint by speaking the number into the second endpoint, during the voice communication session. The transmitted phone number may be associated with the second endpoint, or it may be a phone number that is associated with another endpoint that is not participating in the voice communication session.

Endpoints 32-35 may be any combination of hardware, software and/or encoded logic that provide communication services to a user. For example, endpoints 32-35 may include a telephone, a wireless phone, a cellular phone, an IP phone, a computer running telephony software, or any other communication hardware, software and/or encoded logic that supports communications over communication networks 40, 41, or 42. In the illustrated embodiment, endpoints 32-35 include a cellular telephone, a traditional telephone, a wireless handset, and an internet or IP telephone, respectively. A wireless base station transmitter/receiver (T/R) 36 couples endpoint 34 with communication network 40. Endpoints 32-35 may also include unattended or automated systems, gateways, other intermediate components or other devices that can establish media sessions.

Although FIG. 1 illustrates four endpoints 32-35 coupled to communication networks 40, 41, and 42, communication system 30 contemplates any number and arrangement of endpoints coupled to networks 40, 41, 42, or networks coupled to networks 40, 41, and 42, each of the endpoints being capable of establishing communication sessions with other endpoints. For example, the described technologies and techniques for transferring a phone number between or among endpoints 32-35 may be accomplished by transferring a phone number from an endpoint coupled to network 42 to endpoint 32. Alternatively, the phone number may be transferred from an endpoint coupled to network 41 to an endpoint coupled to network 40.

Although specific communication networks 40, 41, and 42 are illustrated in FIG. 1, the term "communication network" should be interpreted as generically defining any network capable of transmitting audio and/or video telecommunications signals, data, and/or messages. Communication network 40 may be any computer or communication network capable of coupling two or more endpoints for communication. In the illustrated embodiment, communication network 40 is a wide area network (WAN) that enables communication between a plurality of endpoints distributed across multiple cities and geographic regions. Communication network 41 is a public switched telephone network (PSTN) and communication network 42 is a cellular communication network. However, reference to a communication network within this specification may mean one or more networks, including the Internet, the public switched telephone network, local area networks (LANs), global distributed networks such as intranets, extranets or other form of wireless or wireline communication networks.

Generally, communication network 40 provides for the communication of packets, cells, frames and/or other portions of information (generally referred to as packets) between and among endpoint. Communication paths for the communication of such packets may include any combination of routers, hubs, switches, gateways (e.g., gateway 44) or other hardware, software or embedded logic implementing any number of communication protocols that allow for the exchange of packets in communication system 30.

In accordance with particular embodiments of the present invention, communication network 40 employs communication protocols that allow for the addressing or identification of endpoints, such as, for example, endpoints 32-35, coupled to communication network 40. For example, using Internet protocol (IP), each of the components coupled together by communication network 40 in communication system 30 may be identified in information directed using IP addresses. In this manner, communication network 40 may support any form and combination of point-to-point, multicast, unicast or other techniques for exchanging media packets among components in communication system 30.

Any given communication session between two of endpoints 32-35 may include the transfer of packets across one or more communication paths that couple endpoints 32-35 across communication network 40. Such paths may include any combination of network components, gatekeepers, call managers, routers, hubs, switches, gateways, endpoints or other hardware, software or embedded logic implementing any number of communication protocols that allow for the exchange of packets in communication system 30.

Network 40 may be directly coupled to other IP networks including, but not limited to, the Internet. Since IP networks share a common method of transmitting data, telecommunication signals may be transmitted between telephony devices located on different, but interconnected, IP networks. In addition to being coupled to other IP networks, network 40 may also be coupled to non-IP telecommunication networks through the use of gateway 44. For example, network 40 is coupled to Public Switched Telephone Network (PSTN) 41. PSTN 41 includes switching stations, central offices, mobile telephone switching offices, pager switching offices, remote terminals and other related telecommunications equipment that are located across the country.

IP networks transmit data (including voice and video data) by placing the data in packets and sending each packet individually to the selected destination. Unlike a circuit-switched network (like PSTN 41), dedicated bandwidth is not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). In the illustrated embodiment, endpoints 34 and 35 are IP telephony devices. IP telephony devices have the capability of encapsulating a user's voice (or other inputs) into IP packets so that the voice can be transmitted over network 40. Conversely, IP telephony devices 34 and 35 have the capability of receiving audio IP packets from the network 40 and playing the audio data to a user.

A codec (coder/decoder) at the endpoint converts the voice, video, or fax signals generated by the users of the telephony devices from analog media signals into digital form. The codec may be implemented either in software or as special-purpose hardware in the endpoints. In the case of an IP telephone, as the user speaks into the handset, the codec converts the analog voice signals into digital data. The digitally encoded data is then encapsulated into IP packets so that it can be transmitted over network 40. Conversely, another codec at the receiving endpoint converts the digital data into analog media for the users of the telephony devices. In the case of an IP telephone, digital data from IP encapsulated packets are received from the network 40. The codec at the receiving endpoint converts the digital voice, video or fax data from the network 40 into analog media to be played to the users of the telephony devices.

Gateway 44 may accomplish several functions, such as converting analog or digital circuit-switched data transmitted by PSTN 41 to packetized data transmitted by network 40 and vice-versa. When voice data packets are transmitted from network 40, gateway 44 retrieves the data contained in the incoming packets and converts this digital data to the analog or digital format used by the PSTN trunk to which gateway 44 is coupled. Since the digital format for voice transmissions over an IP network is often different than the format used on the digital trunks of PSTN 41, the gateway provides conversion between these different digital formats, which is referred to as transcoding. Gateway 44 also translates between the VoIP call control system and other signaling protocols (e.g., SS7, T1, ISDN, etc.) used in PSTN 41 and translates and/or maps between the IP network addresses and PSTN phone numbers.

For voice transmissions from PSTN 41 to network 40, the process is reversed. In a particular embodiment, gateway 44 takes the incoming voice transmission (in either analog or digital form) and converts it into the digital format used by network 40. The digital data is then encapsulated into IP packets and transmitted over network 40.

Endpoint 32, a cellular telephone, represents a mobile communications device, including hardware and any appropriate controlling logic, capable of communicating with other endpoints through cellular network 42. For example, endpoint 32 may communicate through cellular network 42 using base station 46. Endpoint 32 may support any one or more mobile communications technologies, such as global systems for mobile communications (GSM), time division multiple access (TDMA), code division multiple access (CDMA), and any other appropriate communications protocols. Furthermore, according to particular embodiments, endpoint 32 may also support packet-based communication protocols such as Internet Protocol (IP) and wireless standards such as 802.11 to provide for wireless telephony services. In addition, endpoint 32 may support DTMF signal recognition or voice recognition over a cellular channel to enable receiving and storing DTMF signals or spoken, audible signals (e.g., voice commands) from a remote endpoint.

Cellular network 42 represents communications equipment, including hardware and any appropriate controlling logic, for providing wireless telephony services using cellular protocols and technology. Various cellular protocols and technologies may be used by cellular network 42, including but not limited to global system for mobile communications (GSM), time division multiple access (TDMA), code division multiple access (CDMA), and any other appropriate analog or digital cellular protocol or technology. Cellular network 42 may include any number of base stations 46, as well as base station controllers, mobile switching centers, and other appropriate communications equipment for use in communicating with endpoint 32 and PSTN 41. Thus, as illustrated, cellular network 42 may couple to base station 46 to receive and transmit wireless signals to and from endpoint 32.

Figure 2:
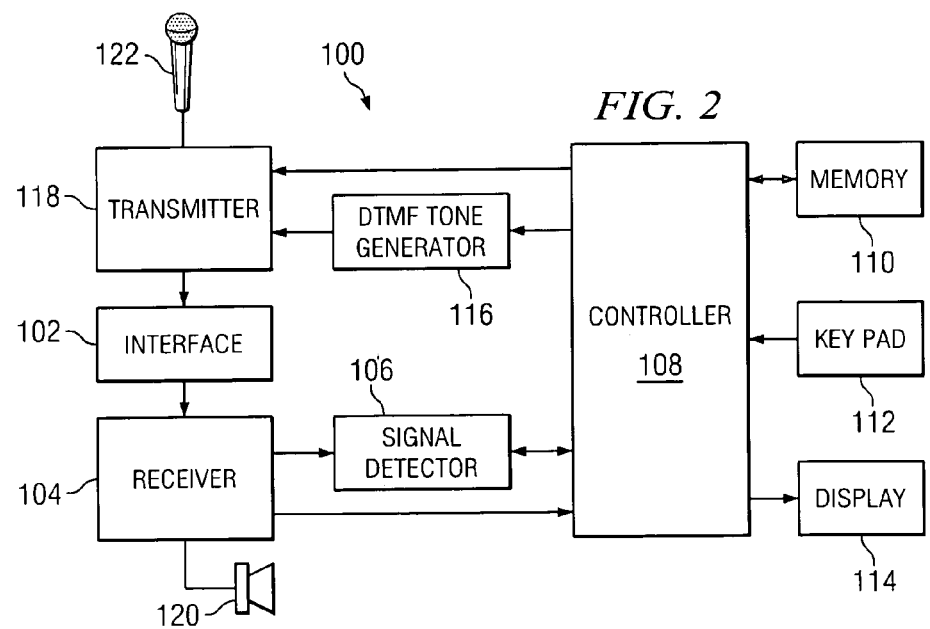
FIG. 2 illustrates one embodiment of an endpoint operable to capture DTMF or voice signals in accordance with the teachings of the present invention.

FIG. 2 is a schematic representation of an endpoint 100 that is capable of sending or receiving a phone number via DTMF signaling or spoken voice commands, in accordance with the teachings of the present invention. Endpoint 100 may be any endpoint, such as endpoint 32 of FIG. 1, capable of sending and receiving DTMF signals and/or voice commands representing a phone number. In the illustrated embodiment, endpoint 100 includes interface 102 which is capable of transmitting DTMF signals and/or voice commands to and receiving DTMF signals and/or voice commands from communication networks, such as communication networks 40, 41, and 42 of FIG. 1.

Endpoint 100 also includes a receiver 104 for receiving incoming signals from interface 102 and a transmitter 118 for transmitting signals to interface 102. Receiver 104 and transmitter 118 may be capable of receiving and transmitting, respectively, DTMF signals transmitted in-band with the voice communications or transmitted out-of-band on a control circuit or other communication pathway. In-band transmission is distinguished from out-of-band transmission because for an in-band transmission, signals, such as DTMF signals, are carried on the same channel as the spoken communications. Out-of-band signaling carries signals on one or more separate control channels.

Receiver 104 may be coupled to a speaker 120 for playing incoming media streams to a user of endpoint 100. Microphone 122 may be coupled to transmitter 118 to pick up spoken communications and commands from a user of endpoint 100. Receiver 104 and transmitter 118 are both coupled to controller 108.

Controller 108 may be coupled to various user interfaces such as display 114 and keypad 112. Keypad 112 may allow input from a user of endpoint 100 to controller 108. Display 114 may allow controller 108 to communicate information back to a user of endpoint 100. Memory 110 is also coupled to controller 108 and may be operable to store signals detected by signal detector 106.

In particular embodiments, signal detector 106 may be operable to detect DTMF signals and/or spoken voice commands received through interface 102 by receiver 104. In some embodiments, signal detector 106 may be activated by a user of endpoint 100 when the user knows a phone number is about to be transmitted. In other embodiments, signal detector 106 may be operable to continuously monitor an incoming media stream from receiver 104.

As the phone number is received by endpoint 100, the numbers may be displayed on display 114 for presentation to a user. The user may decide to place a call to the transmitted phone number. If the user decides to make a call, the user may establish a communication session with the endpoint associated with the transmitted phone number by pressing a button on keypad 112, such as a send or call button, or, if endpoint 100 is capable of voice recognition, by speaking a command into microphone 122. Controller 108 may interpret the command and dial the phone number to establish a connection. Regardless of whether the user of endpoint 100 desires to call the transmitted number, the number may be deleted or saved.

In certain embodiments, the transmitted phone number may be automatically saved in a temporary storage location until it is transferred to a permanent location, or until another number is received. In particular embodiments, the number may be overwritten by the next transmitted phone number received by endpoint 100. Alternative embodiments may allow more than one number to occupy the temporary storage location, and therefore previously transmitted numbers may not be overwritten by more recently transmitted numbers. If the phone number is one that the user of endpoint 100 wishes to save, the user may transfer the phone number to an electronic phone book of endpoint 100.

In particular embodiments, signal detector 106 may contain a DTMF register. The DTMF register may be operable to store the DTMF signals rather than storing them in memory 110. In such an embodiment, the DTMF signals stored in the DTMF register may be transferred to memory 110 by the user of endpoint 100. Transferring the phone number from the DTMF register to memory 110 may include the user saving the phone number in an electronic phone book of memory 110.

Controller 108 is also coupled to DTMF tone generator 116, which is in turn coupled to transmitter 118. DTMF tone generator 116 may be used to generate DTMF tones corresponding to buttons pressed on keypad 112, which may be transmitted by transmitter 118 over interface 102 to a remote endpoint. The DTMF tones generated by DTMF tone generator 116 may correspond to a phone number being transmitted by a user of endpoint 100 to a user of a remote endpoint.

In the illustrated embodiment, endpoint 100 includes a controller 108 and memory 110. Controller 108 may be a microprocessor, controller or any other suitable computing device or resource. Memory 110 may be any form of volatile or nonvolatile memory including, without limitation, magnetic media, optical media, random access memory (RAM), read only memory (ROM), removable media or any other suitable local or remote memory component.

While this example includes specific functional components for endpoint 100, endpoint 100 may include any collection and arrangement of components, including some or all of the enumerated functional components, for communicating with remote endpoints using various communication networks, such as communication networks 40, 41, and 42 of FIG. 1. Thus, endpoint 100 may be practically any type of telephone. Additionally, telephones not including the functionality of endpoint 100 may be modified to include some or all of the functionality of endpoint 100. For example, a DTMF detecting circuit and register may be added to practically any phone to allow the capture of DTMF signals transmitted during a communication session.

Moreover, endpoint 100 contemplates implementing each of the functional components using any suitable combination and arrangement of hardware and/or logic. Thus, in alternative embodiments, endpoint 100 may be a personal digital assistant (PDA), laptop computer, or other device operable to establish voice communications with other endpoints.

It should be understood that the use of signal detector 106 to illustrate the capture of DTMF or spoken signals transmitted from a remote endpoint is for illustration purposes only, and the ability to capture signals representing digits of a phone number may be implemented using any suitable type of communication hardware, software and/or encoded logic.

Figure 3:
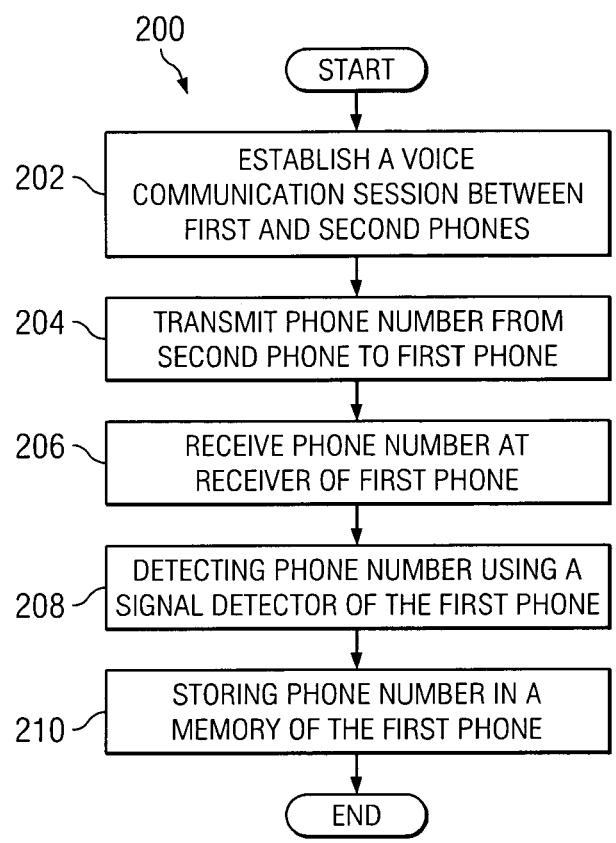
FIG. 3 is a flowchart illustrating the steps of transferring a phone number between phones in accordance with the teachings of the present invention.

FIG. 3 is a flowchart 200 illustrating a method of transferring a phone number from a first phone to a second phone during an active voice communication session. A voice communication session is established between first and second phones at step 202. A conversation may ensue between the users of the first phone and the second phone. During the conversation a user of first phone or second phone may determine that they wish to receive or send a phone number to the other user. In the example illustrated, the user of the second phone is transmitting a number to the user of the first phone.

At step 204, the phone number is transmitted from the second phone to the first phone over the open communication session between the phones. The phone number is received by the first phone at step 206, and is detected by a signal detector of the first phone at step 208. In some embodiments, the signal detector of the first phone may continuously monitor the incoming media stream from second phone. In other embodiments the user of the first phone may activate the signal detector when the user is aware a phone number will be transmitted.

In one embodiment, the user of the second phone may press buttons on the keypad of the second phone to transmit DTMF signals which may be detected by the signal detector of the first phone. In another embodiment, the user of the second phone may speak the digits of the phone number and the voice of the user of the second phone may be detected by the signal detector of the first phone. The signal detector may incorporate voice recognition capability to translate the spoken voice of the user of the second phone into the digits of the phone number.

If DTMF signals are detected at step 208, the DTMF signals may be stored in a DTMF register at step 210. In a particular embodiment, the DTMF signals may be translated into the numbers they represent and may be stored in a memory of the first phone. In a like manner, if the voice of the user of the second phone is detected at step 208, the speech of the user of second phone may be converted to the numbers it represents and stored in a memory of the first phone.

After the phone number has been stored in the memory or a DTMF register of the first phone, the user of the first phone may choose to delete the phone number, dial the phone number, or transfer the phone number to an electronic phone book associated with the first phone.

In a particular embodiment, a user of the first phone may dial the transmitted phone number by pressing a single key, such as the send key, or may speak a command. In certain embodiments, a user of the first phone may save the phone number in an electronic phone book associated with the first phone. This may be accomplished by assigning a name or other identifying information to the phone number or by associating the phone number with an existing entry, and saving the phone number in the phone book of the first phone.

Utilizing the method illustrated by flowchart 200 allows transferring a phone number from a user of a second phone to a user of a first phone without necessitating the user of the first phone to write down or remember any of the digits comprising the phone number. The phone number is automatically stored in a memory of the first phone so that a user of the first phone may dial or save the number as desired.

In some embodiments, the phone number transmitted from the second phone to the first phone may comprise a phone number of a third phone. The user of the first phone may desire to place a separate call to a user of the third phone, or may wish to call back the user of the second phone on the third phone, or may wish to conference in a user of the third phone to the conversation between the users of the first and second phones. All of this functionality, and numerous other communication configurations and/or functionalities, may be accomplished without the need for the user of the first phone to remember or record the number transmitted by the user of the second phone.

Some of the steps illustrated in FIG. 3 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30, these elements may be combined, rearranged, or positioned in order to accommodate connections between endpoints. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method of receiving a phone number, comprising:
    establishing at a first phone a first voice communication session between the first phone and a second phone;

receiving voice signals from the second phone during the first voice communication session;

transmitting voice signals to the second phone during the first voice communication session;

receiving, at a receiver of the first phone during the first voice communication session between the first phone and the second phone, a phone number transmitted from the second phone by a user of the second phone after the first voice communication session is established;

detecting the phone number with a signal detector of the first phone coupled for communication with the receiver of the first phone, the detecting the phone number with the signal detector comprising:

receiving a first user input activating the signal detector after the first voice communication session is established and prior to the transmission of the phone number from the second phone; and receiving a second user input deactivating the signal detector subsequent to detecting the phone number and prior to termination of the first voice communication session; and storing the phone number in a memory of the first phone coupled to the signal detector.

2. The method of claim 1, wherein:

receiving the phone number includes receiving DTMF signals corresponding to the phone number; and the signal detector includes DTMF signal recognition capability.

3. The method of claim 1, further comprising:

retrieving the phone number from the memory;

dialing the phone number; and establishing a second voice communication session between the first phone and a third phone.

4. The method of claim 3, wherein pressing a button on the first phone causes the first phone to retrieve the phone number from the memory and dial the phone number.

5. The method of claim 3, wherein speaking a command into the first phone causes the first phone to retrieve the phone number from the memory and dial the phone number.

6. The method of claim 1, further comprising storing the phone number in an electronic phonebook of the first phone.

7. The method of claim 1, wherein storing the phone number in a memory coupled to the signal detector comprises:

storing the phone number in a temporary memory coupled to the signal detector;

receiving a request to transfer the phone number to permanent memory; and storing the phone number in permanent memory.

8. A method of receiving a phone number, comprising:

establishing at a first phone a first voice communication session between the first phone and a second phone;

receiving voice signals from the second phone during the first voice communication session;

transmitting voice signals to the second phone during the first voice communication session;

receiving, at a receiver of the first phone during the first voice communication session between the first phone and the second phone, a phone number transmitted from the second phone by a user of the second phone after the first voice communication session is established;

detecting the phone number with a signal detector of the first phone coupled for communication with the receiver of the first phone, the detecting the phone number with the signal detector comprising:

receiving a first user input activating the signal detector after the first voice communication session is established and prior to the transmission of the phone number from the second phone; and receiving a second user input deactivating the signal detector subsequent to detecting the phone number;

storing the phone number in a memory of the first phone coupled to the signal detector; and the signal detector includes voice recognition capability.

9. A system for receiving a phone number, comprising:

a keypad of a first phone configured to establish at the first phone a first voice communication session between the first phone and a second phone;

a receiver of the first phone being operable to:

receive voice signals from the second phone during the first voice communication session; and receive a phone number during the first voice communication session between the first phone and the second phone;

a transmitter of the first phone configured to transmit voice signals to the second phone during the first voice communication session;

a signal detector coupled for communication with the receiver of the first phone, the signal detector being operable to detect the phone number, the signal detector being operable to detect the phone number comprising the signal detector being operable to:

receive a first user input activating the signal detector after the first voice communication session is established and prior to the transmission of the phone number from the second phone; and receive a second user input deactivating the signal detector subsequent to detecting the phone number; and memory of the first phone coupled to the signal detector, the memory being operable to store the phone number.

10. The system of claim 9, wherein:

receiving the phone number includes receiving DTMF signals corresponding to the phone number; and the signal detector includes DTMF signal recognition capability.

11. The system of claim 9, further comprising a controller of the first phone coupled to the memory and operable to:

retrieve the phone number from the memory;

dial the phone number; and establish a second voice communication session between the first phone and a third phone.

12. The system of claim 11, wherein the controller is further operable to retrieve the phone number from the memory and dial the phone number upon the pressing of a keypad button on the first phone.

13. The system of claim 11, wherein the controller is further operable to retrieve the phone number from the memory and dial the phone number upon receiving a spoken command from a user of the first phone.

14. The system of claim 9, wherein the memory is further operable to store the phone number in an electronic phonebook of the first phone.

15. A system for receiving a phone number, comprising:

a keypad of a first phone configured to establish at a first phone a first voice communication session between the first phone and a second phone;

a receiver of the first phone being operable to:

receive voice signals from the second phone during the first voice communication session; and receive a phone number during the first voice communication session between the first phone and the second phone;

a transmitter configured to transmit voice signals to the second phone during the first voice communication session;
a signal detector of the first phone coupled for communication with the receiver of the first phone, the signal detector being operable to detect the phone number, the signal detector being operable to detect the phone number comprising the signal detector being operable to:
receive a first user input activating the signal detector after the first voice communication session is established and prior to the transmission of the phone number from the second phone; and
receive a second user input deactivating the signal detector subsequent to detecting the phone number;
memory of the first phone coupled to the signal detector, the memory being operable to store the phone number; and
the signal detector includes voice recognition capability.

16. A system for receiving a phone number, comprising:
means for establishing at a first phone a first voice communication session between the first phone and a second phone;
means for receiving voice signals from the second phone during the first voice communication session;
means for transmitting voice signals to the second phone during the first voice communication session;
means for receiving, at a receiver of the first phone during the first voice communication session between the first phone and the second phone, a phone number transmitted from the second phone by a user of the second phone after the first voice communication session is established;
means for detecting the phone number with a signal detector of the first phone coupled for communication with the receiver of the first phone, the means for detecting the phone number with the signal detector comprising means for:
receiving a first user input activating the signal detector after the first voice communication session is established and prior to the transmission of the phone number from the second phone; and
receiving a second user input deactivating the signal detector subsequent to detecting the phone number; and
means for storing the phone number in a memory of the first phone coupled to the signal detector.

17. The system of claim 16, wherein:
means for receiving the phone number includes means for receiving DTMF signals corresponding to the phone number; and
the signal detector includes DTMF signal recognition capability.

18. A system for receiving a phone number, comprising:
means for establishing at a first phone a first voice communication session between the first phone and a second phone;
means for receiving voice signals from the second phone during the first voice communication session;
means for transmitting voice signals to the second phone during the first voice communication session;
means for receiving, at a receiver of the first phone during the first voice communication session between the first phone and the second phone, a phone number transmitted from the second phone by a user of the second phone after the first voice communication session is established;
means for detecting the phone number with a signal detector of the first phone coupled for communication with the receiver of the first phone, the means for detecting the phone number with the signal detector comprising means for:
receiving a first user input activating the signal detector after the first voice communication session is established and prior to the transmission of the phone number from the second phone; and
receiving a second user input deactivating the signal detector subsequent to detecting the phone number;
means for storing the phone number in a memory of the first phone coupled to the signal detector; and
the signal detector includes voice recognition capability.

19. A non-transitory computer readable medium encoded with code that when executed by a computer is configured to:
establish at a first phone a first voice communication session between the first phone and a second phone;
receive voice signals from the second phone during the first voice communication session;
transmit voice signals to the second phone during the first voice communication session;
receive, at a receiver of the first phone during the first voice communication session between the first phone and the second phone, a phone number transmitted by a user of the second phone after the first voice communication session is established;
detect the phone number with a signal detector of the first phone coupled for communication with the receiver of the first phone, the computer readable medium operable to detect the phone number with the signal detector comprising computer readable medium operable to:
receive a first user input activating the signal detector after the first voice communication session is established and prior to the transmission of the phone number from the second phone; and
receive a second user input deactivating the signal detector subsequent to detecting the phone number; and
store the phone number in a memory of the first phone coupled to the signal detector.

20. The non-transitory computer readable medium of claim 19, wherein:
the code being operable to receive the phone number includes the code being operable to receive DTMF signals corresponding to the phone number; and
the signal detector includes DTMF signal recognition capability.

21. A non-transitory computer readable medium encoded with code that when executed by a computer is configured to:
establish at a first phone a first voice communication session between the first phone and a second phone;
receive voice signals from the second phone during the first voice communication session;
transmit voice signals to the second phone during the first voice communication session;
receive, at a receiver of the first phone during the first voice communication session between the first phone and the second phone, a phone number transmitted by a user of the second phone after the first voice communication session is established;
detect the phone number with a signal detector of the first phone coupled for communication with the receiver of the first phone, the computer readable medium operable to detect the phone number with the signal detector comprising computer readable medium operable to:
receive a first user input activating the signal detector after the first voice communication session is established and prior to the transmission of the phone number from the second phone; and
receive a second user input deactivating the signal detector subsequent to detecting the phone number;
store the phone number in a memory of the first phone coupled to the signal detector; and
the signal detector includes voice recognition capability.

\* \* \* \* \*